(12) United States Patent
Wiese et al.

(10) Patent No.: US 8,358,492 B2
(45) Date of Patent: *Jan. 22, 2013

(54) SURGE PROTECTION SYSTEMS AND METHODS FOR ETHERNET COMMUNICATION EQUIPMENT IN OUTSIDE PLANT ENVIRONMENTS

(75) Inventors: James B. Wiese, Toney, AL (US); Daniel M. Joffe, Owens Crossroads, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/021,505

(22) Filed: Feb. 4, 2011

(65) Prior Publication Data

US 2011/0128661 A1 Jun. 2, 2011

Related U.S. Application Data

(63) Continuation-in-part of application No. 12/430,694, filed on Apr. 27, 2009.

(60) Provisional application No. 61/048,012, filed on Apr. 25, 2008.

(51) Int. Cl.
*H01C 7/12* (2006.01)

(52) U.S. Cl. ......... 361/119; 361/56; 361/91.1; 361/111; 361/118

(58) Field of Classification Search ..................... None
See application file for complete search history.

(56) References Cited

U.S. PATENT DOCUMENTS

| | | | | |
|---|---|---|---|---|
| 4,875,223 A * | 10/1989 | Curtis | ........................... | 375/258 |
| 5,966,382 A * | 10/1999 | Fawal et al. | ................... | 370/419 |
| 6,385,030 B1 | 5/2002 | Beene | | |
| 6,396,673 B1 * | 5/2002 | Yancey et al. | ................ | 361/93.1 |
| 6,449,171 B1 * | 9/2002 | Karnes | ........................... | 361/796 |
| 6,646,546 B1 * | 11/2003 | Butler et al. | ................... | 370/276 |
| 6,982,993 B1 * | 1/2006 | Claveloux et al. | ............ | 370/503 |
| 7,701,689 B1 * | 4/2010 | Joffe et al. | ..................... | 361/119 |
| 2004/0156159 A1 * | 8/2004 | Liebenow | ..................... | 361/118 |
| 2005/0243483 A1 | 11/2005 | Chen et al. | | |
| 2006/0007614 A1 | 1/2006 | Pozzuoli et al. | | |
| 2008/0019501 A1 * | 1/2008 | Miller et al. | .................. | 379/412 |
| 2008/0049458 A1 * | 2/2008 | Pozzuoli et al. | ........... | 363/21.12 |
| 2008/0062600 A1 | 3/2008 | Crawley et al. | | |
| 2008/0084861 A1 * | 4/2008 | Hunter | .......................... | 370/343 |
| 2009/0296302 A1 | 12/2009 | Wiese et al. | | |

FOREIGN PATENT DOCUMENTS

WO 2009132350 10/2009

OTHER PUBLICATIONS

Semtech, "Low Capacitance 3.3 Volt TVS for High Speed Inerfaces," www.semtch.com, Jan. 18, 2008.
Halo Electronics, Inc., "Pro-Tek5 Systems, Ltd. 5KV Isolator," www.haloelectronics.com, Nov. 2007.

* cited by examiner

*Primary Examiner* — Jared Fureman
*Assistant Examiner* — Terrence Willoughby
(74) *Attorney, Agent, or Firm* — Maynard Cooper & Gale, P.C.; Jon E. Holland (57) ABSTRACT

The present disclosure generally pertains to surge protection systems that protect outside plant equipment from high-energy surges. In one exemplary embodiment, a protection system is used for protecting Ethernet equipment that is coupled to an outside Ethernet cable. The protection system provides protection and remains capable of coupling signal energy between an Ethernet cable and Ethernet equipment without significantly degrading Ethernet performance. However, the protection system, while allowing the desirable Ethernet signals to pass between the cable and the equipment, prevents the electrical voltages and currents of high-energy surges, such as surges from lightning or AC power faults, from damaging the Ethernet equipment.

26 Claims, 8 Drawing Sheets

SURGE PROTECTION SYSTEMS AND METHODS FOR ETHERNET COMMUNICATION EQUIPMENT IN OUTSIDE PLANT ENVIRONMENTS

CROSS REFERENCE TO RELATED APPLICATIONS

This application claims is a continuation-in-part of and claims priority to U.S. patent application Ser. No. 12/430,694, entitled "Surge Protection Systems and Methods for Outside Plant Ethernet," and filed on Apr. 27, 2009, which is incorporated herein by reference. U.S. patent application Ser. No. 12/430,694 claims priority to U.S. Provisional Patent Application No. 61/048,012, entitled "Surge Protection System for Outside Plant Ethernet," and filed on Apr. 25, 2008, which is incorporated herein by reference.

RELATED ART

An Ethernet interface, such as a 10/100/1000 BaseT Ethernet, has traditionally been treated as intra-building (inside only) interface much like a RS-232 interface. The Ethernet interface was not intended for deployment in outside plant environments where the interface may be exposed to high-energy lightning and power fault events. Safety organizations, such as Underwriters Laboratories (UL), and corresponding electrical safety standards have not provided protection requirements or guidelines for Ethernet interfaces that are exposed to outside faults. As a result, placing products with inside Ethernet interface protection to an outside environment is generally undesirable. The high-energy lightning and power faults are capable of causing significant product damage and are also electrical safety and fire hazards.

Further, from a performance standpoint, standards such as Telcordia GR-1089-CORE, and Institute of Electrical and Electronics Engineers (I.E.E.E.) Ethernet specifications assume limited exposure to mild transients. The mild transients typically encountered by an inside Ethernet cable are induced from adjacent wiring and/or electrical equipment (e.g., motors, copiers, elevators, medical equipment, etc.). Generally, the existing protection schemes for inside Ethernet interfaces typically comprise transient suppression circuits designed to handle small intra-building transients. Thus, the use of Ethernet cables and interfaces has typically been limited to indoor environments.

Recently, service providers such as Verizon, AT&T, Qwest and various independents, have launched initiatives that expose either the service provider's Ethernet interfaces or the customer's Ethernet interfaces to an outside environment. Hence, Ethernet equipment may be damaged from exposure to high-energy lightning (either induced or via a ground potential rise (GPR)) or an alternating current (AC) power fault. Not only is such an exposure a violation of one or more safety listings, but the provider's placement of equipment may cause loss of service, damage to the equipment, and/or injury to a user.

There exist many conventional surge protection systems for protecting various products from high voltage and/or current surges. However, many such protection systems would degrade the performance of an Ethernet signal such that the requirements of applicable Ethernet standards, such as I.E.E.E. 802.3, would be violated. In this regard, I.E.E.E. 802.3 sets limits on both the insertion loss and return loss of the Ethernet interfaces at frequencies up to 100 mega-Hertz (MHz). Many protection schemes, having been developed for much lower bandwidth circuits, are therefore not suitable to Ethernet.

Moreover, there is a need for a surge protection system that protects equipment coupled to an outside Ethernet cable. It would be desirable for such surge protection system to be compliant with applicable Ethernet transmission standards, such as I.E.E.E. 802.3.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to surge protection systems that protect outside plant equipment from high-energy surges. In one exemplary embodiment, a protection system is used for protecting Ethernet equipment that is coupled to an outside Ethernet cable. The protection system provides protection and remains capable of coupling signal energy between an Ethernet cable and Ethernet equipment without significantly degrading Ethernet performance. However, the protection system, while allowing the desirable Ethernet signals to pass between the cable and the equipment, prevents the electrical voltages and currents of high-energy surges, such as surges from lightning or AC power faults, from damaging the Ethernet equipment.

Figure 1:
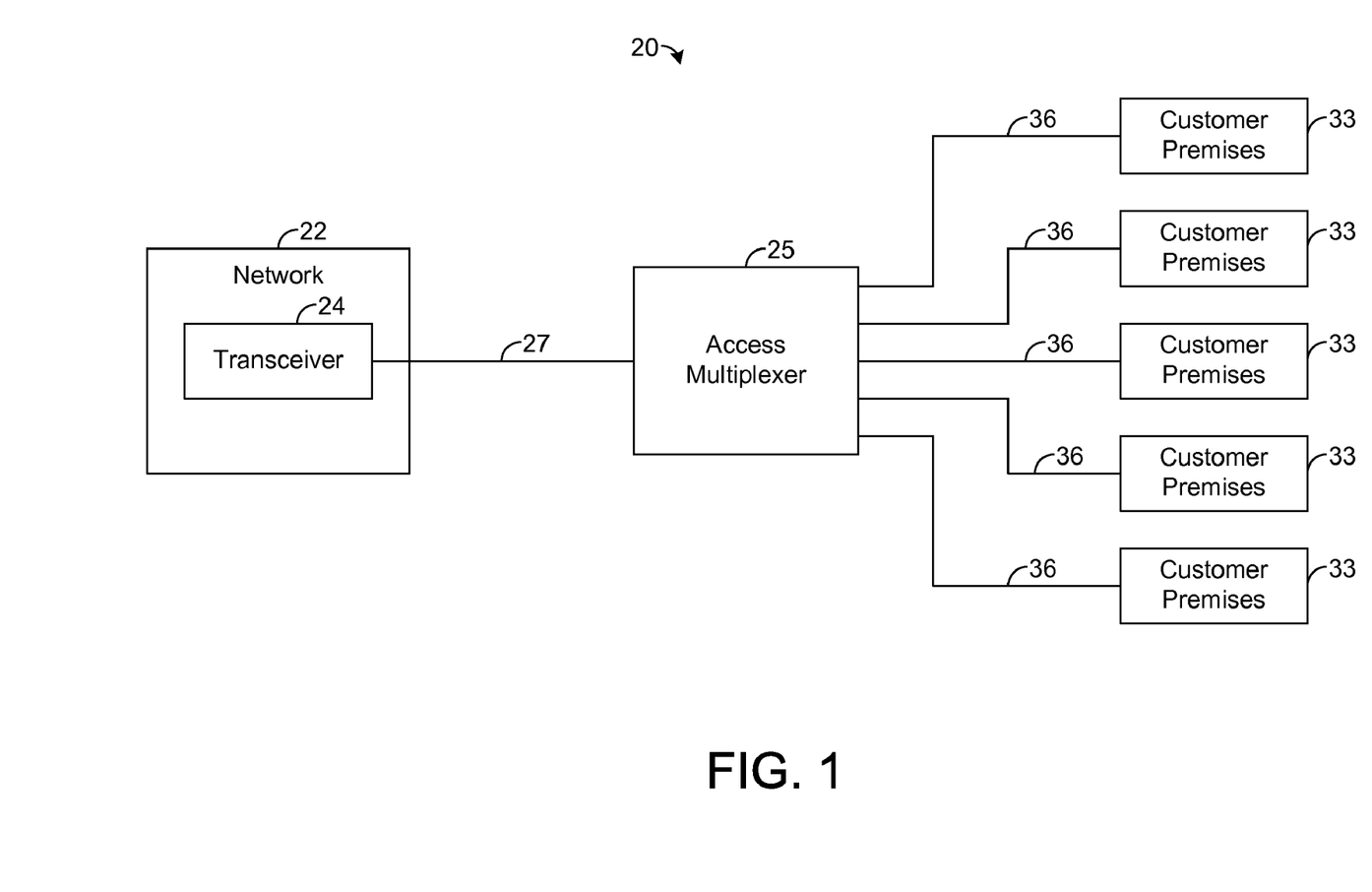
FIG. 1 is a block diagram illustrating an exemplary embodiment of a communication system.

FIG. 1 depicts an exemplary embodiment of a communication system 20. The system 20 comprises a communication network 22. At least one network transceiver 24 is coupled to an access multiplexer 25, such as a Digital Subscriber Line Access Multiplexer (DSLAM), via at least one communication medium 27. For example, the communication medium 27 may comprise at least one conductive connection, such as at least one twisted pair, or at least one optical fiber. The access multiplexer 25 is also coupled to a plurality of customer premises 33 via a plurality of communication media 36. Each communication medium 36 may comprise at least one conductive connection, such as at least one twisted pair. In one exemplary embodiment, at least one of the communication media 36 comprises an Ethernet cable, which typically has a plurality of conductive connections bundled within a cable. For example, one type of Ethernet cable has four twisted pairs bundled within a cable, but Ethernet cables with a different number of conductive connections are also possible.

The access multiplexer 25 is configured to receive a high speed data stream from the network 22 and to demultiplex the received data across the plurality of communication media 36, which often extend for shorter distances relative to the distance of the communication medium 27. Further, the access multiplexer 25 is configured to receive data from a plurality of the customer premises 33 and to multiplex the received data onto the communication medium 27. The use of an access multiplexer to multiplex and demultiplex data is generally well known and will not be described in detail herein for brevity purposes.

Figure 2:
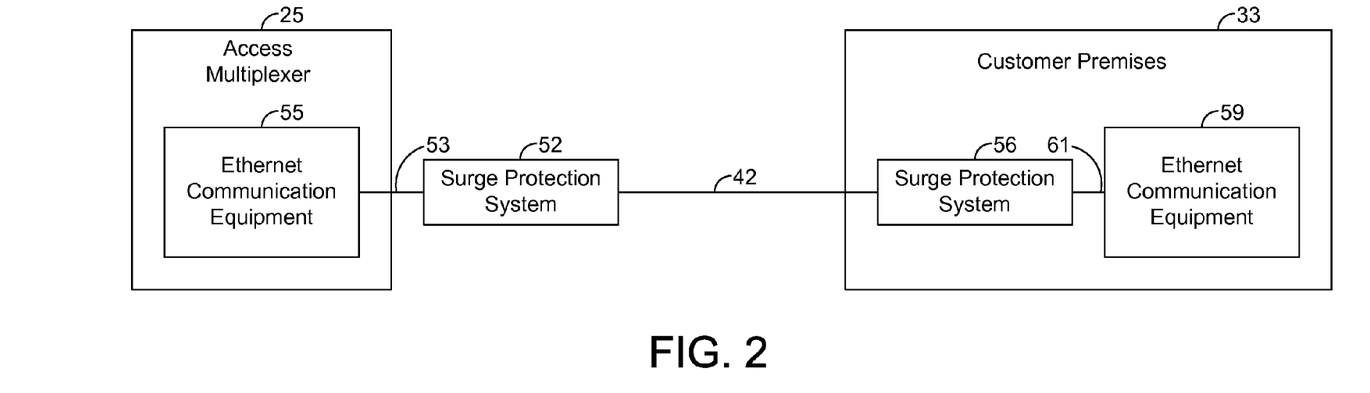
FIG. 2 is a block diagram illustrating an access multiplexer, such as is depicted in FIG. 1, coupled to Ethernet communication equipment at a customer premises via an Ethernet cable. The access multiplexer and the Ethernet communication equipment at the customer premises are protected by surge protection systems.

FIG. 2 depicts an exemplary embodiment in which a customer premises 33 is coupled to the access multiplexer 25 via an Ethernet cable 42, such as a category (CAT) 5 or CAT 6 cable, for example. The access multiplexer 25 is outside (e.g., mounted on a telephone pole), and the Ethernet cable 42 runs outdoors from the customer premises 33 to the access multiplexer 25. The Ethernet cable 42 is, therefore, exposed to high voltage and/or current pulses from lightning, AC power faults, and/or other types of high energy faults. As shown by FIG. 2, one end of the cable 42 is coupled to a surge protection system 52, which is coupled to Ethernet communication equipment 55 of the access multiplexer 25 via an Ethernet cable 53, and the other end of the cable 42 is coupled to a surge protection system 56, which is coupled to Ethernet communication equipment 59 of the customer premises 33 via an Ethernet cable 61. The surge protection system 52 protects the access multiplexer 25 and, in particular, the Ethernet communication equipment 55 from high energy surges, and the surge protection system 56 protects the Ethernet communication equipment 59 of the customer premises 33 from high energy surges.

Figure 3:
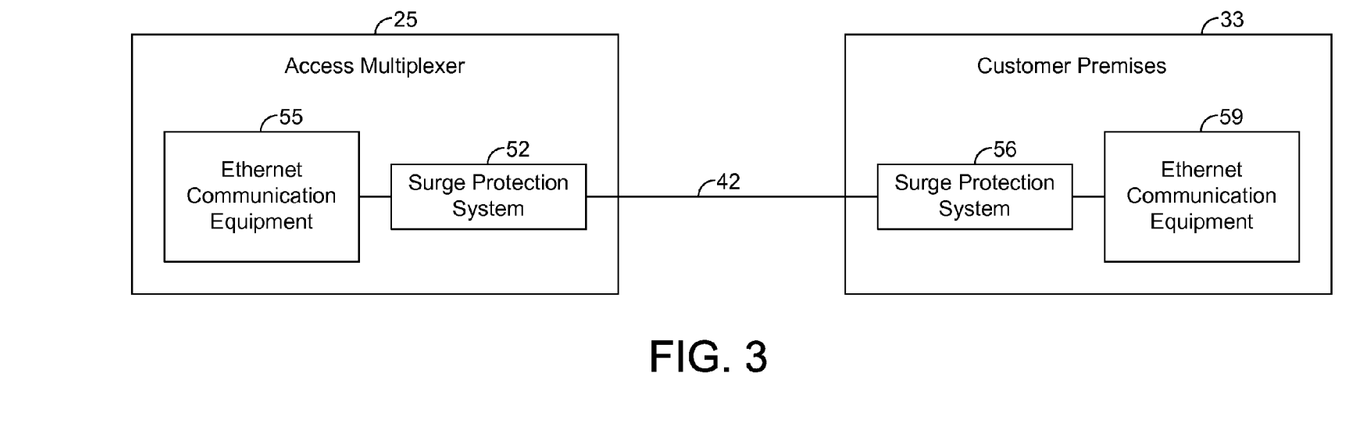
FIG. 3 is a block diagram illustrating an access multiplexer, such as is depicted in FIG. 1, coupled to Ethernet communication equipment at a customer premises via an Ethernet cable. The access multiplexer incorporates a surge protection system.

In one exemplary embodiment, each surge protection system 52, 56 is a stand-alone system. For example, each protection system 52, 56 may form a dongle that is detachably coupled to and, therefore, can be decoupled from the cable 42 and/or the Ethernet communication equipment 55, 59. Alternatively, either system 52, 56 may be integrated with the Ethernet communication equipment 55, 59, respectively. For example, in one exemplary embodiment, the surge protection system 52 is integrated with the Ethernet communication equipment 55 and housed by the access multiplexer housing (not shown in FIG. 2), which also houses the equipment 55. Thus, the system 52 is incorporated into the access multiplexer 25, as shown by FIG. 3. However, in another exemplary embodiment, the system 55 is externally attached to the access multiplexer 25. Various other configurations are possible in other embodiments.

Figure 4:
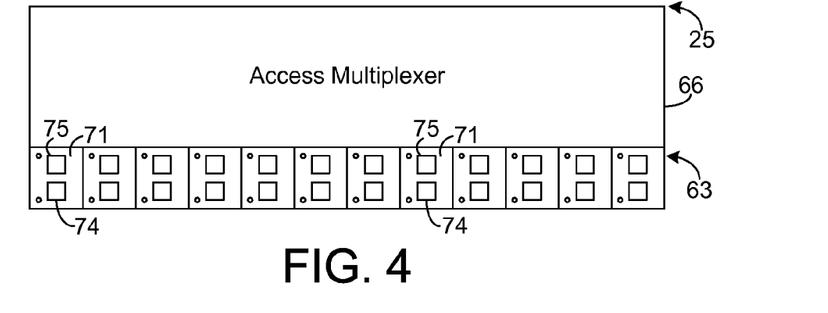
FIG. 4 depicts a chassis for holding surge protection systems. The chassis is mounted on an access multiplexer, such as is depicted in FIG. 2.
Figures 5, 6:
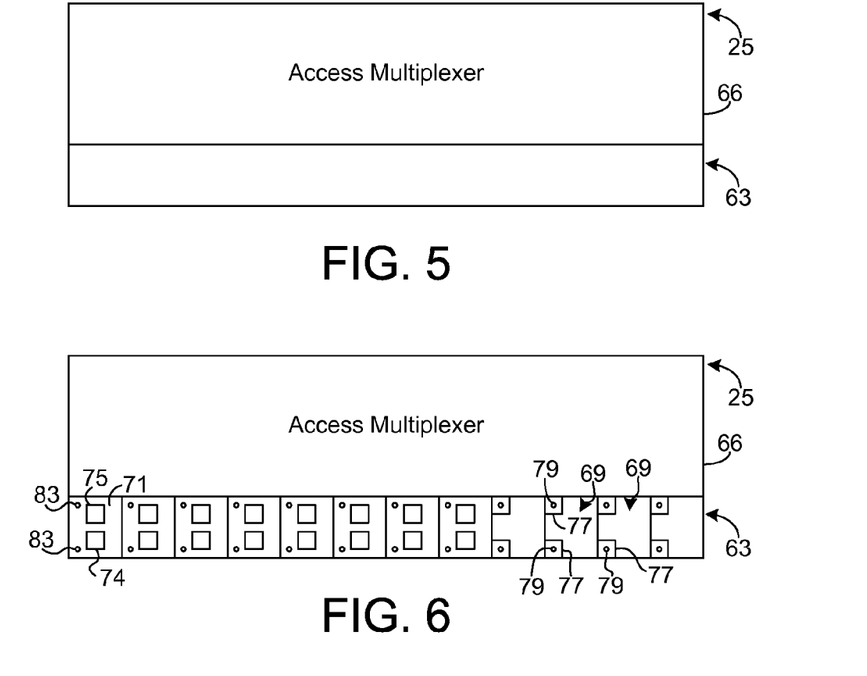
FIG. 5 depicts a side view of the access multiplexer and chassis depicted by FIG. 4.
FIG. 6 depicts a chassis, such as is depicted in FIG. 4, having slots for receiving surge protection systems.
Figure 7:
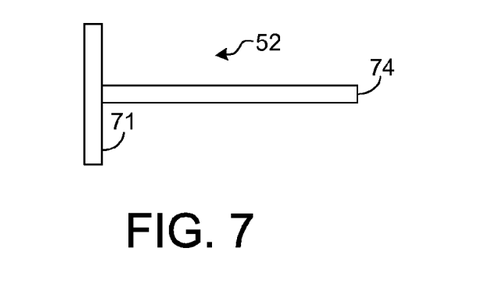
FIG. 7 is a side view illustrating an exemplary embodiment of a surge protection system to be inserted into a slot of the chassis depicted in FIG. 6.

FIGS. 4 and 5 depict an exemplary embodiment in which a chassis 63 is mounted on a housing 66 of the access multiplexer 25. The housing 66 houses the Ethernet communication equipment 55 and other electrical components of the access multiplexer 25. The chassis 63 has a plurality of slots 69 (FIG. 6) into which surge protection systems 52 can be respectively inserted. As shown by FIGS. 6 and 7, each surge protection system 52 has an interface panel 71, which comprises a pair of Ethernet cable connectors 74, 75. For each panel 71, one cable connector 74 is coupled to a respective Ethernet cable 42 extending to a respective customer premises 33, and the other cable connector 75 is coupled to a respective Ethernet cable 53 extending to the Ethernet communication equipment 55 of the access multiplexer 25. Further, as shown by FIG. 7, the panel 71 is coupled to a printed circuit board (PCB) 74, referred to as "card," on which circuitry for protecting the access multiplexer 25 and, in particular, the Ethernet communication equipment 55 from high voltage and/or current surges, as will be described in more detail hereafter.

As shown by FIG. 6, each slot 69 of the chassis 63 is associated with a pair of tabs 77 having holes 79. A respective surge protection system 52 is inserted into a slot 69, and the inserted system 52 is secured to the chassis 63 and, therefore, the access multiplexer 25, by inserting a pair of screws 83 or other coupling devices, through the interface panel 71 and the holes 79 of the associated tabs 77. In other embodiments, other configurations of the chassis 63 and surge protection system 52 are possible, and other techniques may be used to secure a surge protection system 52 to the chassis 63 and/or access multiplexer 25.

Figure 8:
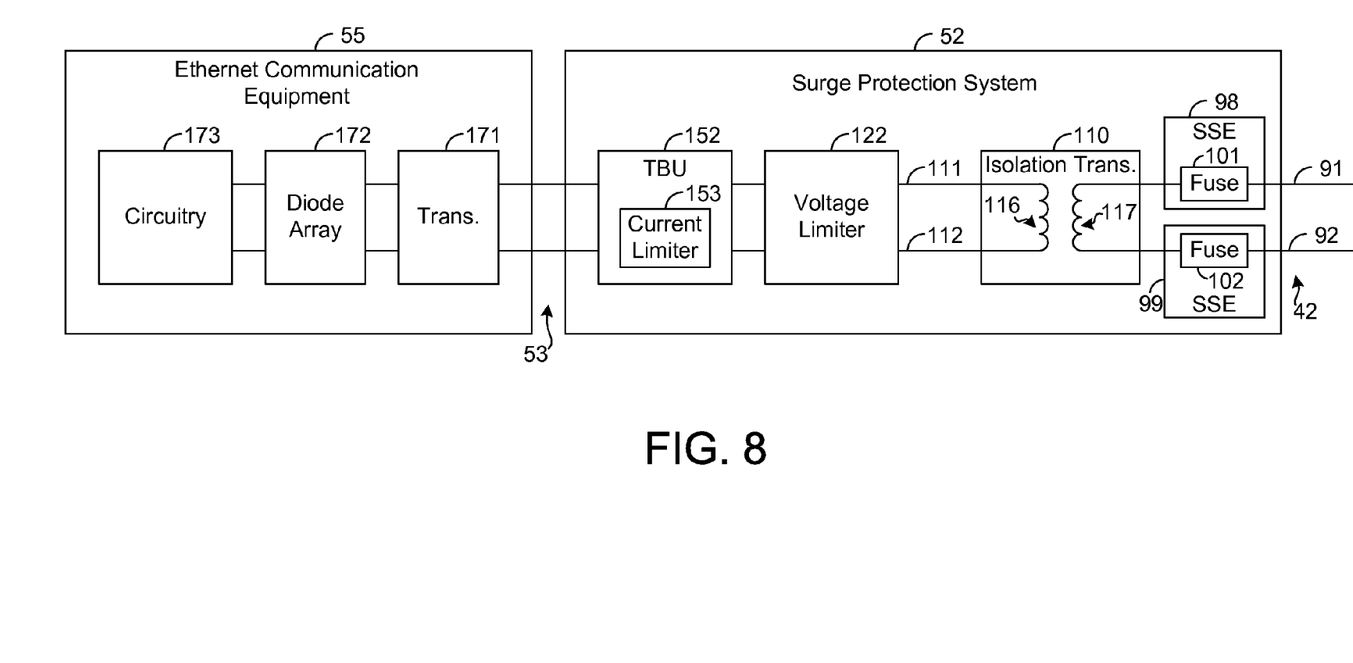
FIG. 8 is a block diagram illustrating an exemplary embodiment of a surge protection system, such as is depicted in FIG. 2.

FIG. 8 depicts an exemplary embodiment of the surge protection system 52 and Ethernet communication equipment 55. Note that the surge protection system 56 and the Ethernet communication equipment 59 at the customer premises 33 may be similarly configured. In addition, for simplicity, FIG. 8 shows a pair of conductive connections 91, 92 of the Ethernet cable 42. As described above, the Ethernet cable 42 may have additional conductive connections that are similarly arranged such that the system 52 provides surge protection across all of the conductive connections of the Ethernet cable 42.

As shown by FIG. 8, each connection 91, 92 is coupled to a respective surge suppression element (SSE) 98, 99. Each surge suppression element 98, 99 is configured to allow current to flow during normal operation such that the data signals propagating across the connections 91, 92 are substantially unaffected by the presence of the surge suppression elements 98, 99. However, in a fault condition resulting in a power surge, such as a 60 Hz power fault or lightning strike, each surge suppression element 98, 99 is configured to suppress energy from the surge. FIG. 8 shows a surge suppression element 98, 99 coupled to each connection 91, 92, but other configurations are possible in other embodiments. For example, a single surge suppression element 98 or 99 may be coupled to only one of the connections 91 or 92. Further, any number of surge suppression elements 98, 99 may be coupled to connections 91 and/or 92.

There are various types of devices that can be use to implement the surge suppression elements 98, 99. In one exemplary embodiment, as shown by FIG. 8, each surge suppression device 98, 99 comprises a respective fuse 101, 102. Each fuse 101, 102 is normally in a closed state such that electrical current is allowed to flow through the fuse 101, 102. However, when the current exceeds a threshold level, each fuse 101, 102 is configured to transition to an open circuit state. Once a fuse 101, 102 so transitions or, in other words, is "tripped," the fuse can be manually reset or replaced. For illustrative purposes, it will be assumed hereafter unless otherwise indicated that each surge suppression element 98, 99 comprises a fuse 101, 102, but it should be emphasized that other types of surge suppression devices can be used in other embodiments.

Each of the fuses 101, 102 is coupled to an isolation transformer 110, which isolates the conductive connections 91, 92 of the Ethernet cable 42 from the Ethernet communication equipment 55. In this regard, the Ethernet communication equipment 55 is coupled to the surge protection system 52 via conductive connections 111, 112. The transformer 110 has a set of windings 116 coupled to the connections 111, 112 and a set of windings 117 coupled to the connections 91, 92. Energy from the connections 91, 92 couples to the connections 111, 112 and vice versa thereby allowing energy to pass through the transformer 110. For example, an Ethernet signal may propagate from the connections 91, 92 to the connections 111, 112, or an Ethernet signal may propagate from the connections 111, 112 to the connections 91, 92.

In one exemplary embodiment, the isolation transformer 110 has a high bandwidth, passing frequencies in the range from about 1 MHz to 100 MHz or more, sufficient for accommodating Ethernet signals, although other pass-bands are possible in other embodiments. In one exemplary embodiment, the transformer 110 has a band-pass frequency profile that blocks frequencies below a low threshold, such as about 1 MHz, and above a high threshold, such as about 200 MHz. In addition, the surge protection system 52 has low insertion loss and high return loss. The transformer 110 also has a high isolation voltage, such as about 5 kilo-Volts (kV) or more, sufficient for protecting the Ethernet communication equipment 55 from high voltage surges within the surge protection system 52. In one exemplary embodiment, the transformer 110 is constructed by using bi-filar windings to help reduce leakage inductance. In addition, the windings of the transformer 110 have heavy insulation that is thick enough so that the transformer 110 exhibits the desired isolation voltage, which is about 5 kV or more in one exemplary embodiment. As a mere example, the Halo Pro-Tek5 transformer, which has previously been used to provide isolation of a patient from indoor medical diagnostic equipment, may be used to implement the isolation transformer 110 of FIG. 8. The Halo Pro-Tek5 transformer is sold by HALO Electronics, Inc., 1861 Landings Drive, Mountain View, Calif. 94042.

Ethernet signals are within the pass-band of the transformer 110 and are allowed to propagate through the transformer 110 without significant degradation. Preferably, the insertion loss is as low as possible and below about 1 decibel (dB) to reduce degradation of the Ethernet signal and allow a longer reach of the Ethernet cable 42. However, a higher insertion loss is possible in other embodiments. Using the Halo Pro-Tek5 transformer, the insertion loss for an Ethernet signal would be about 0.1 decibel (dB) or less.

Energy from high voltage and/or current pulses can couple between the transformer's windings 116, 117 causing high voltage and/or current pulses or "transients" to appear on the connections 111, 112 due to lightning or AC power faults. The surge protection system 52 preferably has circuitry to sufficiently suppress such high voltage and/or current transients, referred to hereafter as "high energy transients," before they reach the Ethernet communication equipment 55 such that damage to the equipment 55 is prevented.

In this regard, as shown by FIG. 8, the isolation transformer 110 is coupled to a voltage limiter 122, which is configured to suppress high energy transients propagating on the connections 111, 112. In particular, the voltage limiter 122, limits the voltage potential between the connections 111, 112.

Figure 9:
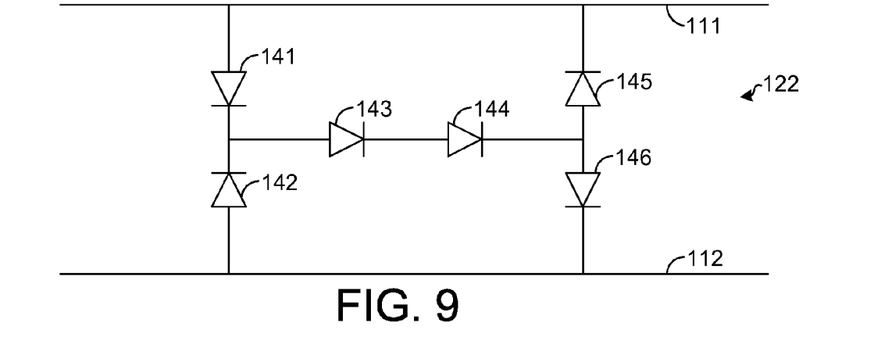
FIG. 9 is a circuit diagram illustrating an exemplary embodiment of a voltage limiter, such as is depicted in FIG. 8.

FIG. 9 depicts an exemplary embodiment of the voltage limiter 122. The exemplary voltage limiter 122 of FIG. 9 comprises a diode array of six diodes 141-146. The diodes 141, 142 are in series and couple the connection 111 to the connection 112. The diodes 145, 146 are also in series and couple the connection 111 to the connection 112. The diodes 143, 144 form a bridge that couples the node between the diodes 141, 142 to the node between the diodes 146, 145, as shown by FIG. 9. In one exemplary embodiment, each diode 141-146 is an S1M diode, Adtran p/n 3442S1MS. The capacitance of the voltage limiter 122 is about 14.8 pico-Farads (pF) measured between the connection 111 and the connection 112. In other embodiments, other arrangements, diode types, and capacitances are possible.

Figure 10:
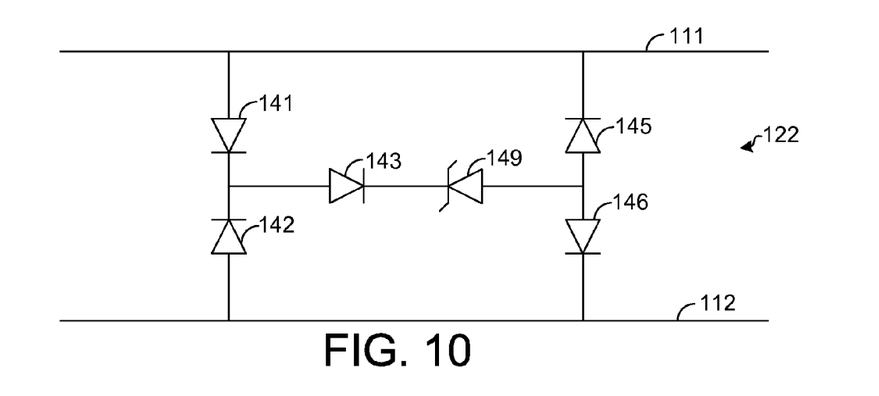
FIG. 10 is a circuit diagram illustrating an exemplary embodiment of a voltage limiter, such as is depicted in FIG. 8.

FIG. 10 depicts another exemplary embodiment of the voltage limiter 122. The embodiment of FIG. 10 is identical to the embodiment of FIG. 9 except that the diode 144 of FIG. 9 is replaced by a zener diode 149 of opposite polarity.

Figure 11:
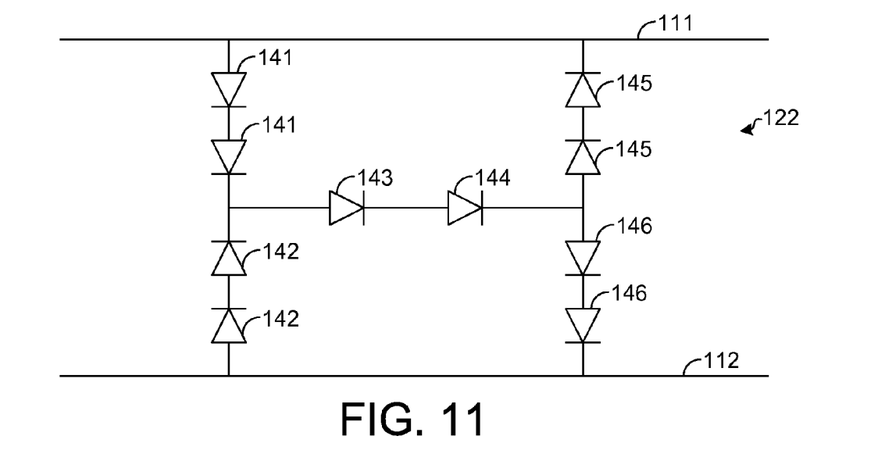
FIG. 11 is a circuit diagram illustrating an exemplary embodiment of a voltage limiter, such as is depicted in FIG. 8.

FIG. 11 depicts another exemplary embodiment of the voltage limiter 122. Using the same types of diodes, the voltage limiter 122 of FIG. 11 has about half of the capacitance and about the same transient suppression performance compared to the exemplary embodiment of FIG. 9, although it does allow about 1.5 times more voltage before limiting. This voltage is still low enough to offer protection.

As shown by FIG. 8, the voltage limiter 122 is coupled to a transient blocking unit (TBU) 152, which is configured to suppress any high energy transients that pass through the voltage limiter 122. In one exemplary embodiment, the transient blocking unit 152 comprises a current limiter 153, as shown by FIG. 8. Other types of devices for the transient blocking unit 152 are possible in other embodiments. The transient blocking unit 152 is an added layer of protection and may be left out of the design if it is believed that the voltage limiter 122 is likely to provide sufficient transient suppression.

FIG. 8 also depicts an exemplary embodiment of the Ethernet communication equipment 55 being protected by the surge protection system 52. Other configurations are possible in other embodiments. In the exemplary embodiment shown by FIG. 8, the equipment 55 has a transformer 171, a diode array 172, and circuitry 173 for processing (e.g., modulating or demodulating) signals communicated by the equipment 55. The transformer 171, diode array 173, and circuitry 173 are coupled in series to the surge protection system 52.

Figure 12:
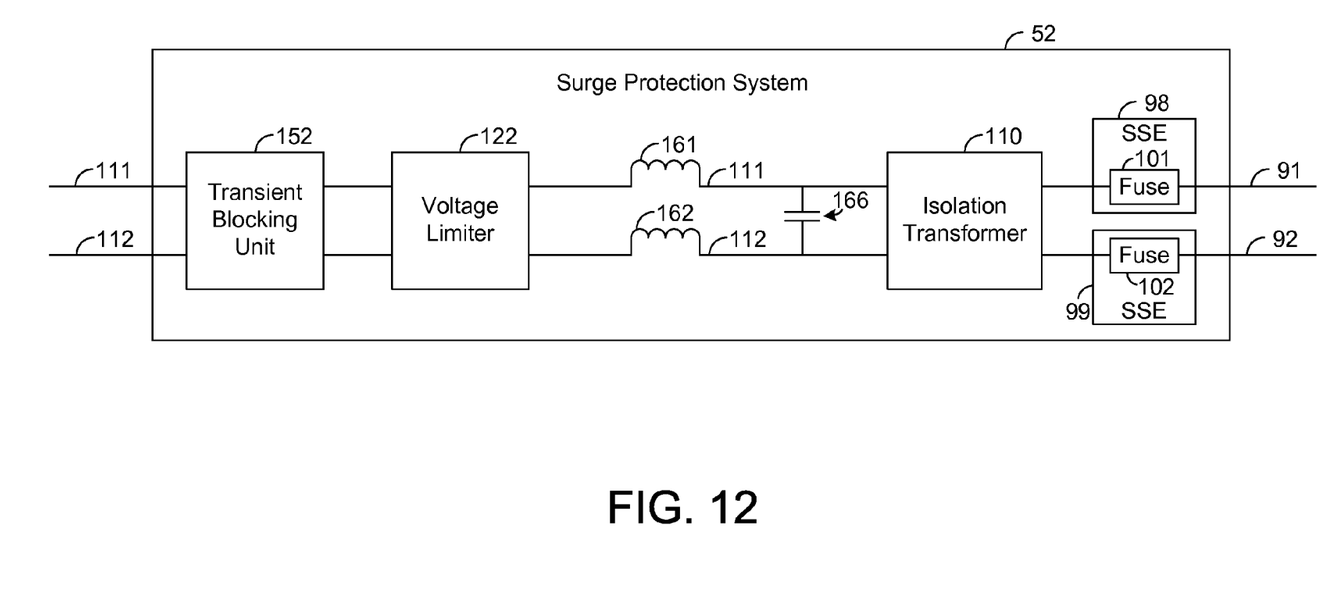
FIG. 12 is a block diagram illustrating an exemplary embodiment of a surge protection system, such as is depicted in FIG. 2.

Capacitance generally degrades the quality of an Ethernet signal propagating through the surge protection system 52. Thus, it is generally desirable to limit the capacitance of the voltage limiter 122 to help keep the system 52 compliant with applicable Ethernet standards, such as I.E.E.E. 802.3 and to help maximize the reach of the Ethernet cable 42. In one exemplary embodiment, as shown by FIG. 12, at least one inductor 161, 162 is used to compensate for the capacitance of the voltage limiter 122. Thus, as the impedance of the voltage limiter 122 drops with rising frequency, the impedance of the inductors 161, 162 increases effectively canceling the change in impedance of the voltage limiter 122 over a range of frequencies, inclusive of the expected bandwidth of the Ethernet signal, which is about 1 MHz to about 100 MHz. Thus, the overall impedance of the surge protection system 52 remains substantially constant in at least the range of about 1 MHz to 100 MHz, but other ranges are possible in other embodiments.

Note that the use of the inductors 161, 162 enables the voltage limiter 122 to have a higher capacitance and, therefore, larger diodes 161-166, thereby improving the array's transient suppression. Accordingly, by using the inductors 161, 162, the system 52 is able to handle larger surges without damaging the Ethernet communication equipment 55 being protected by the system 52 while remaining compliant with applicable Ethernet standards, such as I.E.E.E. 802.3.

Figure 13:
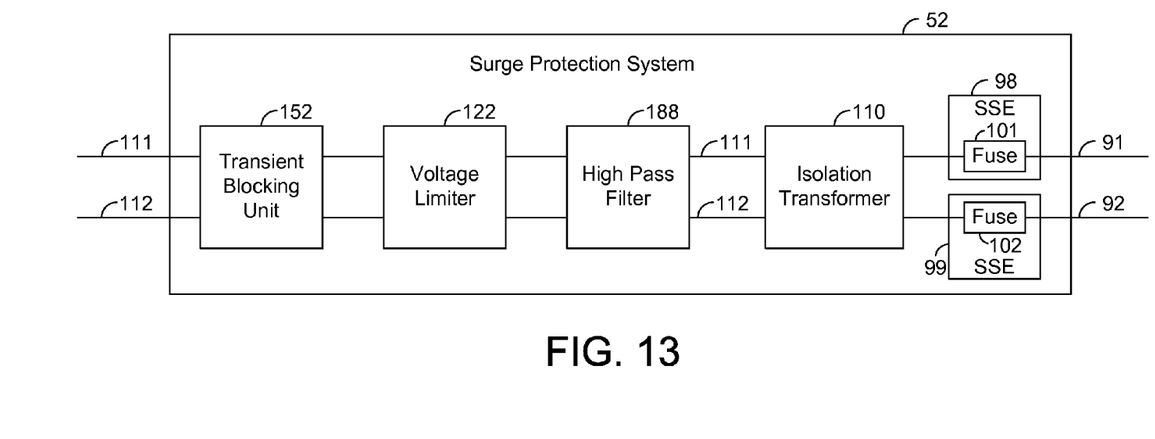
FIG. 13 is a block diagram illustrating an exemplary embodiment of a surge protection system, such as is depicted in FIG. 2.

In addition, the isolation transformer 110 has some leakage inductance and the fuses 101, 102 also have some inductance. In one exemplary embodiment, as shown by FIG. 13, at least one capacitor 166 is used in order to compensate for the inductance of the isolation transformer 110 and the fuses 101, 102. Thus, as the impedance of the transformer 110 and fuses 101, 102 rises with rising frequency, the impedance of the capacitor 166 decreases effectively canceling the change in impedance of the transformer 110 and fuses 101, 102 over a range of frequencies, inclusive of the expected bandwidth of the Ethernet signal.

In general, the sizes of the inductors 161, 162 and the capacitor 166 are selected such that the impedance of the surge protection system 52 remains substantially constant over a range of frequencies, inclusive of the expected bandwidth of the Ethernet signal. In one exemplary embodiment, the impedance of the surge protection system 52 over the expected bandwidth of the Ethernet signal substantially matches that of the Ethernet connections 91, 92 within the cable 42 to help increase return loss. Typically, such impedance is about 100 Ohms, but other impedances are possible. Although some tolerance in the impedance matching is acceptable, the closer that the impedance of the surge protection system 52 matches that of the Ethernet cable 42, the higher is the return loss. The impedance matching is sufficiently close to ensure that the Ethernet signal remains compliant with applicable Ethernet standards, such as I.E.E.E. 802.3.

Figure 14:
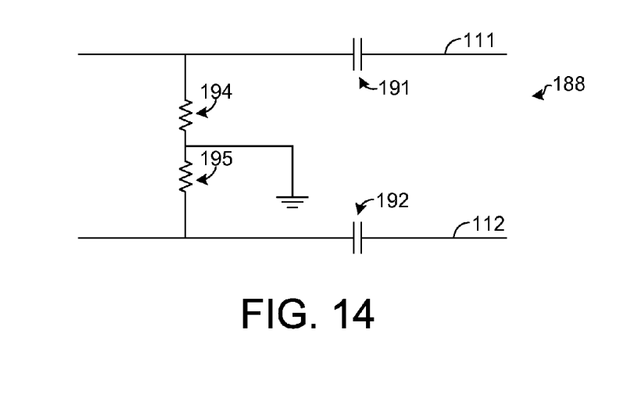
FIG. 14 is a circuit diagram illustrating an exemplary high pass filter, such as is depicted in FIG. 13.

FIG. 13 depicts an exemplary embodiment of the surge protection system 52. The surge protection system 52 of FIG. 13 is similar to that of FIG. 8 except that the system 52 of FIG. 13 has a high pass filter 188 in series with the voltage limiter 122. The high pass filter 188 is configured to suppress energy below a certain frequency, referred to as the "cut-off frequency." In one exemplary embodiment, the cut-off frequency is about 1 MHz or just below the expected bandwidth of the Ethernet signal. However, other cut-off frequencies are possible in other embodiments. FIG. 14 depicts an exemplary embodiment of the high pass filter 188.

The exemplary high pass filter 188 of FIG. 14 has a capacitor 191 coupled to the connection 111 and a capacitor 192 coupled to the connection 112. In addition, the high pass filter 188 has a pair of series resistors 194, 195 that couple the connection 111 to the connection 112. The node between the resistors 194, 195 is coupled to ground. The capacitors 191, 192 provide a low impedance path for the Ethernet signal and block lower frequencies. The resistors 194, 195 are selected to provide a desired 3 decibel break frequency, although other types of break frequencies may be provided in other embodiments.

The suppression provided by the high pass filter 188 reduces the total energy that the voltage limiter 122 must suppress to sufficiently protect the Ethernet equipment 55. Thus, using the high pass filter 188 allows smaller diodes to be selected for the voltage limiter 122 thereby reducing the capacitance of the voltage limiter 122 and the effect of the voltage limiter 122 on the Ethernet signal.

Figure 15:
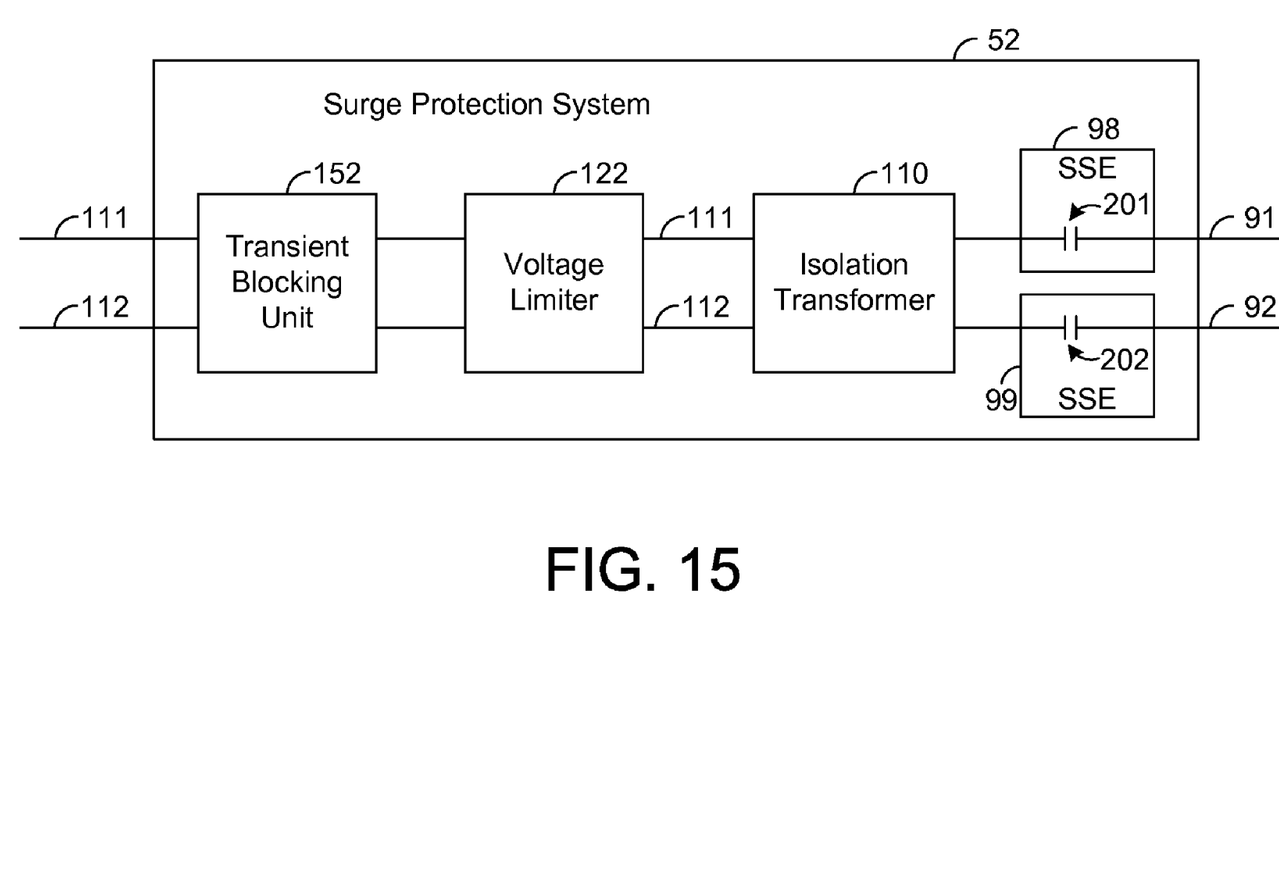
FIG. 15 is a block diagram illustrating an exemplary embodiment of a surge protection system, such as is depicted in FIG. 2.

FIG. 15 depicts an exemplary embodiment of the surge protection system 52. In the embodiment depicted by FIG. 15, each surge suppression element 98, 99 comprises a respective capacitor 201, 202 that is coupled between the isolation transformer 110 and a respective connection 91, 92. In FIG. 15, the capacitors 201, 202 are used in lieu of the fuses 101, 102 (FIG. 8), but in other embodiments, the capacitors 201, 202 can be used in addition to the fuses 101, 102 and/or other types of devices for suppressing electrical current. Indeed, any of the connections 91, 92 may be coupled to any number of devices for suppressing electrical current, though it is generally desirable for at least one connection 91 or 92 to be coupled to at least one such device to help suppress energy from a fault condition.

Each capacitor 201, 202 has a capacitance that is selected to be large enough to pass the lowest frequency of the data signals propagating across the connections 91, 92. However, the capacitance is small enough so that it blocks much, if not all, of the energy at 60 Hz in order to suppress surges resulting from a 60 Hz power fault. Notably, lightning strikes are characterized by a fast rise time and a slow decay. By making the capacitance small enough to block energy at 60 Hz, each capacitor 201, 202 also blocks slow moving portions of a surge waveform that results from a lightning strike. Accordingly, each capacitor 201, 202 drops the total energy of such a surge waveform helping to suppress energy from a lightning strike.

As a mere example, assume that the connections 91, 92 have a resistance of 100 Ohms, where the data signal propagating across the connections 91, 92 has no significant energy below 100 kHz. A capacitor 201, 202 having a capacitance of about 0.01592 micro-Farads ($\mu$F) provides a high pass function that is about −3 dB at 100 kHz. The capacitor 201, 202 also attenuates 60 Hz power cross events by a factor of about 64.4 dB.

In addition, the high pass action reduces the energy that must be withstood from the tails of a lightning strike. A typical lightning strike might be described as a 1000 V 10×1000 pulse, meaning that it rises in 10 microseconds to 1000 V, then decays to about half its previous value every 1000 microseconds. As an exponential decay, the 10×1000 pulse has a time constant of about 1.44 milliseconds. The 100 kHz high pass filter has an exponential decay of approximately 1.59 microseconds. Thus, the pulse passed through the transformer 110 lasts just a few microseconds, rather than a few milliseconds.

Moreover, in the exemplary embodiments described above, the surge protection systems are capable of providing suitable surge protection without significantly degrading the Ethernet signal. Thus, the Ethernet signal remains compliant with applicable Ethernet standards, such as I.E.E.E. 802.3.

Now, therefore, the following is claimed:

1. A communication system having a surge protection system for outside plant Ethernet, comprising:

Ethernet communication equipment configured to transmit Ethernet signals across a first conductive connection and a second conductive connection of an Ethernet cable extending through an outside plant environment, the Ethernet communication equipment configured to receive Ethernet signals from the first and second conductive connections of the Ethernet cable;

an isolation transformer coupled to the first and second conductive connections between the Ethernet communication equipment and the Ethernet cable, the isolation transformer having a pass-band sufficient for passing an Ethernet signal propagating via the first and second conductive connections;

at least one surge suppression element coupled to at least one of the first and second conductive connections; and a voltage limiter coupled to and positioned between the isolation transformer and the Ethernet communication equipment, the voltage limiter configured to limit a voltage potential between the first and second conductive connections thereby suppressing high energy transients from the isolation transformer, wherein an isolation voltage of the transformer is sufficiently high such that a high energy power fault occurring on the Ethernet cable is prevented from damaging the Ethernet communication equipment, and wherein the communication system is arranged such that the Ethernet signals transmitted by the Ethernet communication equipment pass through the voltage limiter, isolation transformer, and surge suppression element and propagate across the first and second conductive connections of the Ethernet cable.

2. The communication system of claim 1, wherein the Ethernet communication equipment resides within a housing of an access multiplexer, and wherein the Ethernet cable extends from the surge protection system to a customer premises.

3. The communication system of claim 1, wherein the isolation transformer, surge suppression element, and voltage limiter are integral with the Ethernet communication equipment.

4. The communication system of claim 1, wherein an insertion loss of the isolation transformer is less than 1 decibel.

5. The communication system of claim 1, wherein the isolation voltage is at least 5,000 Volts.

6. The communication system of claim 1, further comprising a transient blocking unit coupled to and positioned between the Ethernet communication equipment and the voltage limiter.

7. The communication system of claim 1, wherein the voltage limiter comprises a diode bridge.

8. The communication system of claim 1, wherein the isolation transformer, surge suppression element, and voltage limiter are inserted into a slot of a chassis that is mounted on an access multiplexer.

9. The communication system of claim 1, further comprising at least one capacitor for compensating for an inductance of the isolation transformer and an inductance of the surge suppression element such that the impedance of the isolation transformer, surge suppression element, and voltage limiter is substantially constant over a range of frequencies inclusive of the frequency of the Ethernet signal, wherein the capacitor is coupled to the voltage limiter.

10. The communication system of claim 1, further comprising at least one inductor for compensating for a capacitance of the voltage limiter such that the total impedance of the isolation transformer, surge suppression element, and voltage limiter is substantially constant over a range of frequencies inclusive of the frequency of the Ethernet signal, wherein the inductor is coupled to the voltage limiter.

11. The communication system of claim 1, wherein the total impedance of the isolation transformer, surge suppression element, and voltage limiter is about 100 Ohms.

12. The communication system of claim 1, wherein the voltage limiter comprises a diode array, and wherein the communication system further comprises a high pass filter coupled to the isolation transformer and the diode array.

13. The communication system of claim 1, wherein the surge suppression element comprises a fuse.

14. The communication system of claim 1, wherein the surge suppression element comprises a capacitor.

15. The communication system of claim 14, wherein the capacitor is configured to block energy having a frequency of 60 Hertz.

16. The communication system of claim 14, wherein the capacitor is configured to block energy in a frequency range below the pass-band.

17. The communication system of claim 14, wherein an impedance of the surge protection system substantially matches an impedance of the Ethernet cable for a frequency of the Ethernet signal.

18. A communication system, comprising:

a network;

an access multiplexer coupled to the network, the access multiplexer having Ethernet communication equipment, the access multiplexer coupled to a customer premises via an Ethernet cable having a plurality of conductive connections including at least a first conductive connection and a second conductive connection; and a surge protection system coupled to the Ethernet cable and the Ethernet communication equipment, the surge protection system comprising:

a surge suppression element coupled to the first conductive connection;

an isolation transformer coupled between the plurality of conductive connections and Ethernet communication equipment, the isolation transformer having a pass-band sufficient for passing an Ethernet signal propagating via the first and second conductive connections, wherein the Ethernet communication equipment is configured to transmit Ethernet signals across the first and second conductive connections and to receive Ethernet signals from the first and second conductive connections, and wherein the Ethernet cable extends through an outside plant environment;

a high pass filter coupled to the isolation transformer; and a voltage limiter coupled to and positioned between the high pass filter and the Ethernet communication equipment, the voltage limiter configured to limit a voltage potential between the first and second conductive connections thereby suppressing high energy transients from the high pass filter, wherein an isolation voltage of the transformer is sufficiently high such that the surge protection system prevents a high energy power fault occurring on the Ethernet cable from damaging the Ethernet communication equipment, and wherein the surge protection system is arranged such that the Ethernet signals transmitted by the Ethernet communication equipment pass through the isolation transformer, high pass filter, and voltage limiter and propagate across the first and second conductive connections.

19. The communication system of claim 18, wherein the voltage limiter comprises a diode array.

20. The communication system of claim 18, further comprising at least one capacitor for compensating for an inductance of the isolation transformer and an inductance of the surge suppression element such that the impedance of the surge protection system is substantially constant over a range of frequencies inclusive of the frequency of the Ethernet signal propagating via the first and second conductive connections, wherein the capacitor is coupled to the voltage limiter.

21. The communication system of claim 18, further comprising at least one inductor for compensating for a capacitance of the voltage limiter such that the impedance of the surge protection system is substantially constant over a range of frequencies inclusive of the frequency of the Ethernet signal propagating via the first and second conductive connections, wherein the inductor is coupled to the voltage limiter.

22. The communication system of claim 18, wherein the surge suppression element comprises a fuse.

23. The communication system of claim 18, wherein the surge suppression element comprises a capacitor.

24. The communication system of claim 23, wherein the capacitor is configured to block energy having a frequency of 60 Hertz.

25. The communication system of claim 23, wherein the capacitor is configured to block energy in a frequency range below the pass-band.

26. The communication system of claim 18, wherein an impedance of the surge protection system substantially matches an impedance of the Ethernet cable for a frequency of the Ethernet signal.

* * * * *